United States Patent [19]

Shelton, Jr.

[11] Patent Number: 4,505,722

[45] Date of Patent: Mar. 19, 1985

[54] GAS TREATING APPARATUS AND PROCESS

[76] Inventor: L. C. Shelton, Jr., Pampa, Tex. 79065

[21] Appl. No.: 508,460

[22] Filed: Jun. 27, 1983

[51] Int. Cl.$^3$ .................. B01D 47/06; B01D 47/12
[52] U.S. Cl. .......................................... 55/89; 55/94; 55/95; 55/223; 55/227; 55/228; 55/240; 261/22; 261/112; 261/117; 261/125; 62/17; 62/20; 208/340
[58] Field of Search ................ 55/89, 93–95, 55/223, 227, 228, 240, 248, 259; 261/22, 112, 117, 119 R, 125, 126; 208/340; 62/17, 20

[56] References Cited

U.S. PATENT DOCUMENTS

| | | | |
|---|---|---|---|
| 1,846,206 | 2/1932 | Kallam | 55/89 |
| 2,681,799 | 6/1954 | Van Ackeren | 261/117 |
| 2,733,054 | 1/1956 | Van Ackeren | 261/117 |
| 3,714,790 | 2/1973 | Battey | 55/89 |
| 3,869,264 | 3/1975 | Richards | 55/89 |
| 4,070,165 | 1/1978 | Colton | 55/89 |

FOREIGN PATENT DOCUMENTS

| | | | |
|---|---|---|---|
| 2751956 | 6/1978 | Fed. Rep. of Germany | 55/89 |
| 664726 | 1/1952 | United Kingdom | 261/119 R |

OTHER PUBLICATIONS

Package Trays for Pipe Size Process Vessels, Nutter Engineering Company, copyright 1961, by I. Earl Nutter.

Primary Examiner—David L. Lacey

Attorney, Agent, or Firm—Fidelman, Wolffe & Waldron

[57] ABSTRACT

In a system for recovering liquefiable components from well head gases and like gaseous mixtures, a vapor liquid contact apparatus which comprises a combination of a tower shell and liquid spray unit with an absorption unit inside of and supported by the shell so as to permit relative movement of the shell and component parts of the absorption unit.

The absorption unit is formed of a multiplicity of superposed plates connected by vertical gas and liquid conduits, a peripheral annular aperture surrounding each plate. In the absorption unit the chambers formed between plates are connected by the vertical liquid conduits for flow of liquid down through the chambers and by the vertical gas conduits for flow of gas up through the chambers, chamber to chamber, the gas conduits being located at the periphery of the plates and adjacent the tower shell.

Gas enters each chamber of the absorption unit at the chamber top, adjacent one side edge, and flows across and down the chamber to leave at the chamber bottom adjacent an opposing side edge. The liquid sprayed into the chamber is directed so as to divert gas flow toward the side and bottom walls of the chamber. Droplets entrained in the gas become absorbed in liquid films that are present on the side and bottom walls of the chamber. The gaseous mixtures passing up through the vapor liquid contact apparatus becomes reduced in liquefiable components.

8 Claims, 18 Drawing Figures

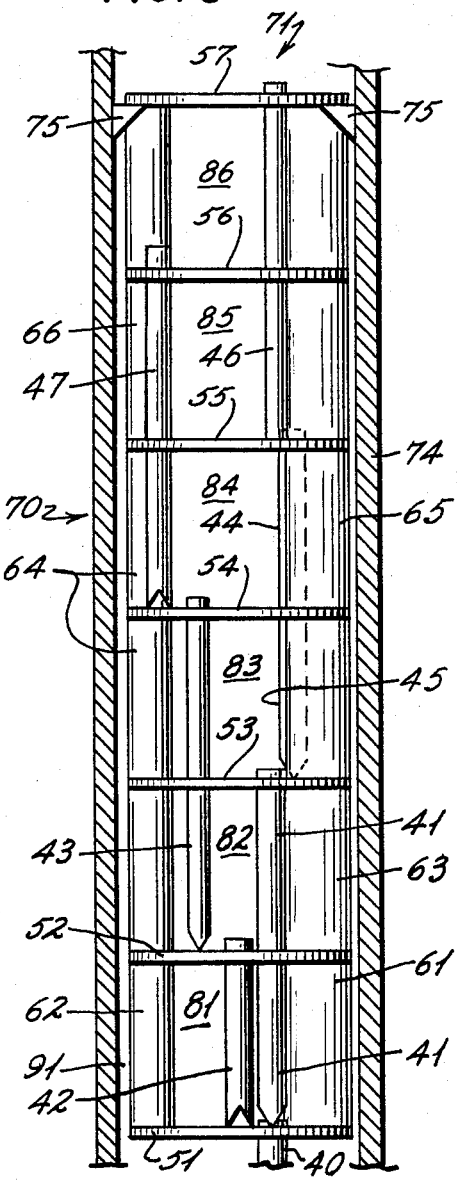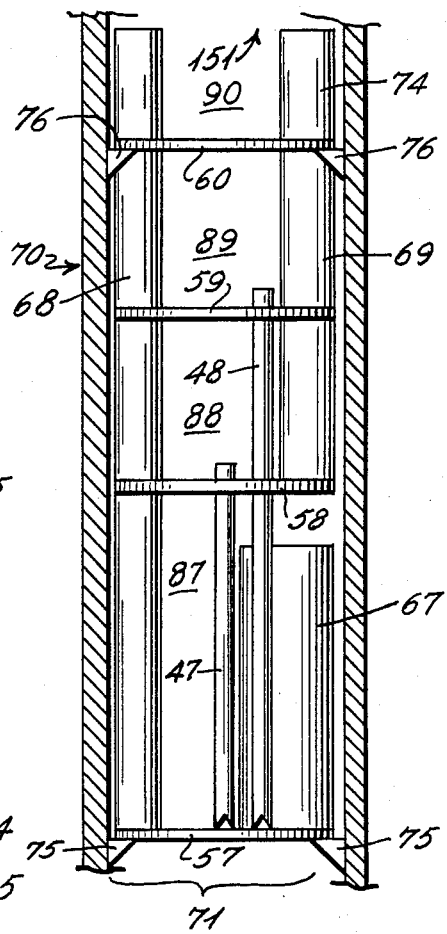

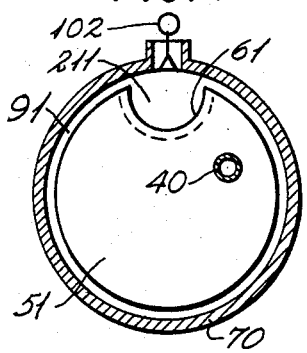
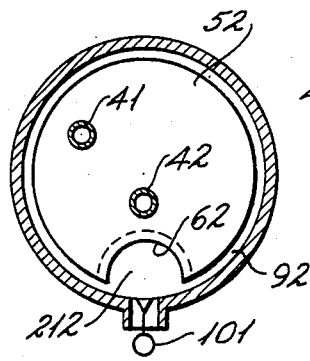
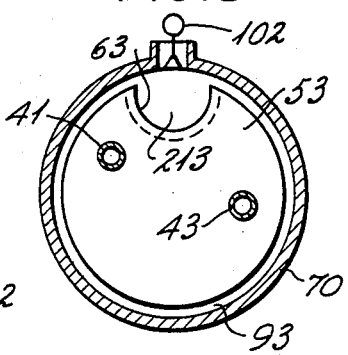
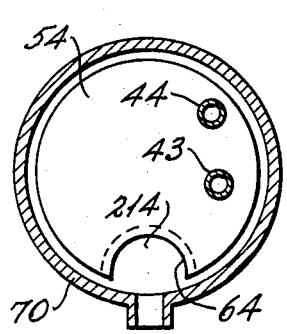
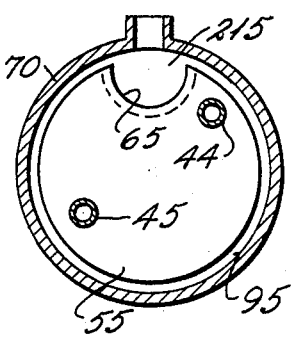
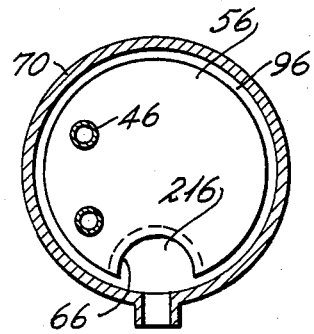
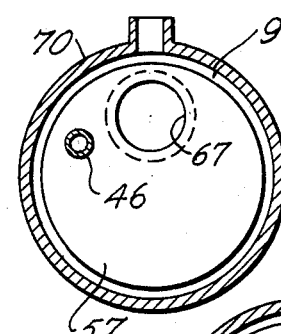
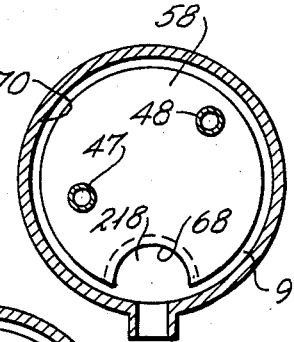
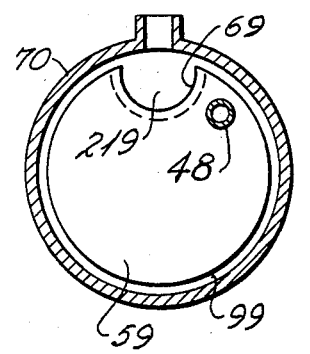
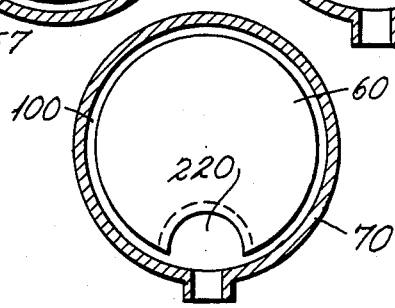

GAS TREATING APPARATUS AND PROCESS

This application includes improvements in my earlier filed Disclosure Document No. 101,236 filed July 6, 1981 entitled Raw Gas Treating Apparatus.

BACKGROUND OF THE INVENTION

1. Field of the Invention

The field of art to which this invention pertains is vapor-liquid contacting and recovery of liquifiable fractions from well head gaseous mixtures.

2. The Prior Art

The prior art structures of series of closed chambers connected by or containing perforated trays, bubble caps and packed columns provided high pressure drops, low area of contact of gaseous mixtures to be treated and absorber liquor, and a sensitivity of such apparatuses to clogging by sediments developed from naturally occurring feeds with consequent variations in orifices for passage of gaseous suspensions therethrough.

SUMMARY OF THE INVENTION

The vapor-liquid contact apparatus disclosed provides for use in an overall separatory system a combination of a shell and spray unit with a plate and tube element unit which combination provides a peripheral annular aperture surrounding each plate unit. That combination structure in a gas-vapor contact assembly avoids separate closed chambers and provides stable vertically extending as well as horizontally extending liquid surfaces to provide contact area between to-be-treated gas mixtures and suspensions therein, bodies of absorbing liquor and sprays thereof with large vapor-liquid contact area and minimum pressure drops and absence of small orifices and insensitivity to clogging by sediment accumulation.

BRIEF DESCRIPTION OF THE DRAWINGS

FIGS. 5 and 6 show broken away views of portion of the contact tower shown in FIG. 4. Such broken away views are partially taken along a vertical diametral longitudinal section of shell 70. Thereby the shell 70 is shown partially in section FIGS. 5 and 6 show the spatial relations of the vertical liquid conduits 40-47, gas conduits 61-69, and trays 51-60 as seen in side view in the operating embodiment.

FIGS. 7-16 are horizontal transverse sectional views through each of the trays 51-60 respectively; these views are taken looking upward from the bottom of each of the trays 51-60 respectively and show the position of the vertical conduits which pass through those plates.

DESCRIPTION OF THE PREFERRED EMBODIMENT

Figure 1:
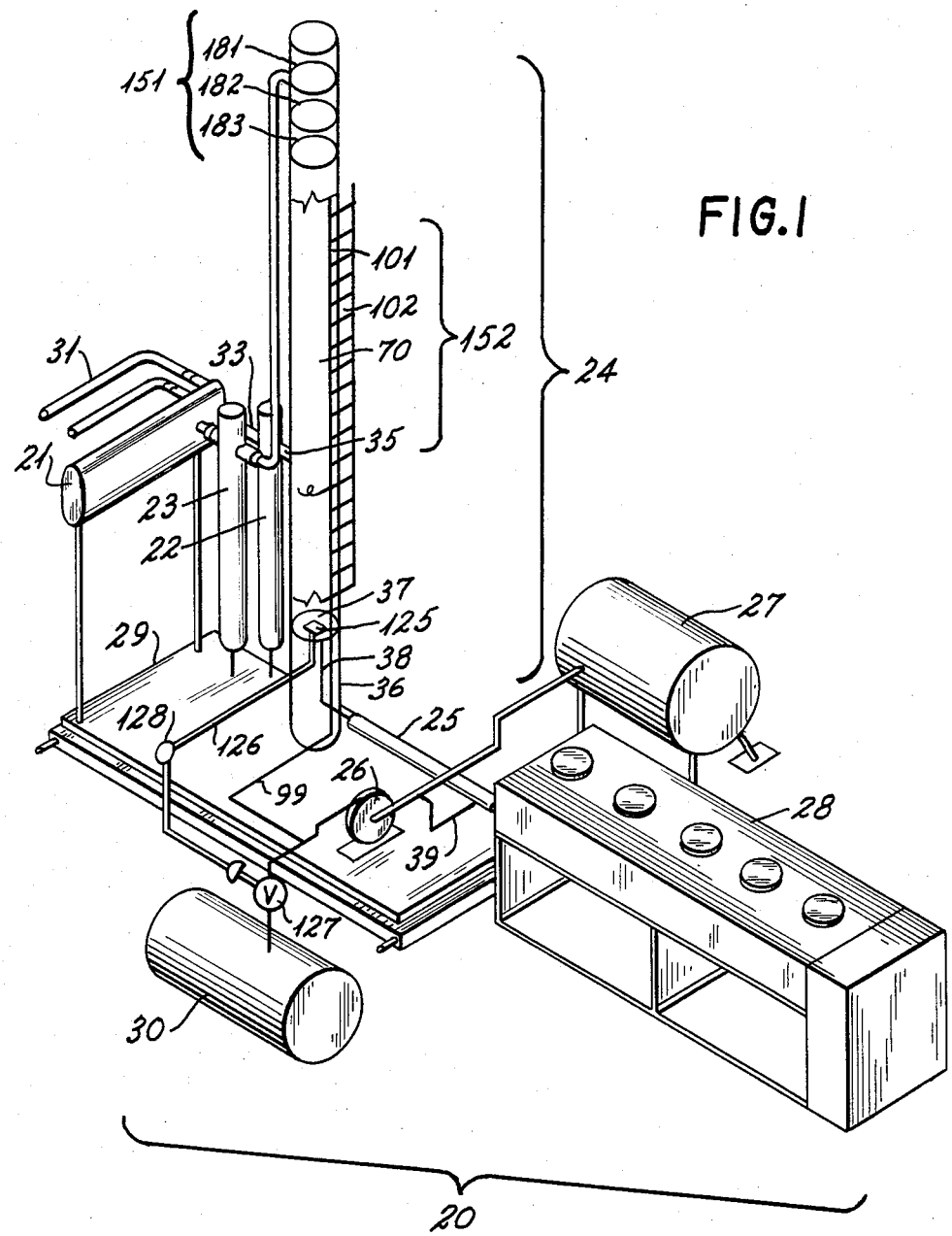
FIG. 1 is an overall perspective view of the preferred embodiment of the apparatus assembly and system according to this invention.

In the preferred embodiment 20 of this apparatus assembly shown generally in FIG. 1, the principal components of the assembly 20 are a gas-to-gas exchanger 21, an inlet scrubber 22, an outlet scrubber 23, a contact tower 24, a chiller barrel 25, a pump 26, a freon compressor 28, a skid support 29, and a liquid fraction product collection tank 30.

The apparatus is used to treat gases coming from a well which produces gas and liquefiable gases and/or oil. The apparatus 20 is located at the wellhead or at a gathering station which treats gasoline and well head gas. In operation the feed gas to the apparatus 20 is fed to the inlet line 31 and passes to the gas-to-gas exchanger inlet 32, thence to the gas-to-gas exchanger 21 and thence via the gas exchanger outlet line 33 to the inlet scrubber 22

Figure 3:
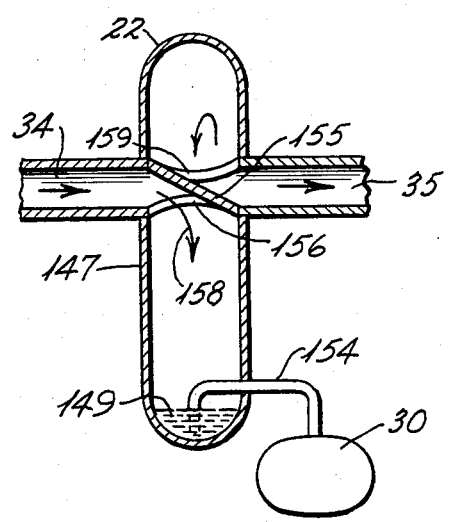
FIG. 3 is a diagramatic longitudinal sectional view of the scrubber 22 of FIG. 1.

Scrubber 22 comprises a vertically extending cylindrical shell 147, and inlet conduit 34 and an outlet 35, separated by an imperforate plate 155 as shown diagramatically in FIG. 3. Conduit 34 has a downwardly facing orifice 156 within shell 147 below and adjacent plate 155; conduit 35 has an upwardly facing orifice 159 above and adjacent plate 155. The gas exchanger outlet line 33 passes to the inlet conduit 34 of scrubber 22; plate 155 directs the input gaseous mixture and suspension stream downwards through opening 156 along path 158 whereby solids and some liquids drop out from the input stream and are collected at sump 149. The remaining gaseous mixture and suspension passes by path 157 upward of shell 147 and into orifice 159 and outward by conduit 35. A siphon 154 automatically removes liquor from the sump 149 without clogging by usual sediments carried by wellhead gases. The low temperature outlet gas from tower 24 precools the incoming feed in the heat exchanger 21 so that some liquefiable hydrocarbons are readily separated out from the feed to the scrubber 22 as a liquid phase in the scrubber 22. Such liquid material collected in scrubber 22 meets with and agglomerates solid particles suspended in the incoming gas mixture stream. Such solid particular material is gathered in the bottom of the scrubber 22. The siphon line 154 serves to remove liquids from the bottom of the scrubber 22 and is not clogged by accumulation of solids in the bottom of that scrubber.

The scrubber outlet line 35 passes the to-be treated gas suspension to the top of the lower liquid gathering zone 36 at the lower portion of the contact tower 24. The liquor 37 which is gathered in zone 36 passes by the line 38 to a chiller barrel 25 whereat it is brought into heat exchange with the cold FREON from the FREON compressor 28 and cooled to about minus 20 degrees Fahrenheit. The thus cooled liquid from the chiller barrel passes by line 39 to the pump 26 whereat it is compressed to a fixed pressure, usually 15 p.s.i.g. in one embodiment of operation; in another embodiment the chilled pressure may be 300 to 400 pounds per square inch. The thus compressed liquid passes by the pump outlet line 99 to vertical nozzle distribution lines 101 and 102 to the contact tower 24.

The cold liquid from the lines 101 and 102 passes by a plurality of nozzles as 103-120 and 206 into contact with the gaseous mixture and suspension flowing into and through and being treated within the contact tower 24. Details of this contact of such liquid and such flowing gas mixture are herebelow described in relation to the operation of the contact tower 24 and details of its structure.

No separate absorption liquid is required to absorb the liquid hydrocarbon fractions from the gaseous mixture fed to the system 20 as the absorption liquor provided by refrigeration of the feed mixture and utilization of that liquor serves to absorb the liquefiable hydrocarbon fractions components from the feed mixture in tower 24.

A methanol storage tank 27 is connected to the inlet of pump 26 and is added to lines 101 and 102 to prevent freezing of water in apparatus 24: the methanol and water are recovered from tank 30 in conventional manner.

Contact tower 24 is provided in zone 36 with a liquid level sensor 125 which operates through a standard control line 126 and controller 128 to operate a valve 127 whereby the liquor sent by the pump 26 is directed to the storage tank 30 as well as to lines 101 and 102 when the liquid level of the liquor 37 in the bottom of the tower 24 is above the level of the sensor 125.

Figure 2:
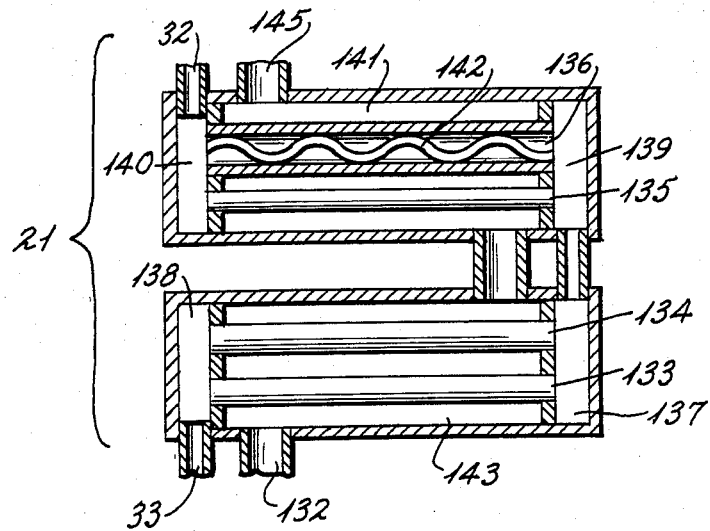
FIG. 2 is a diagramatic view of components of the gas-to-gas exchanger 21 of the assembly of FIG. 1.

The gaseous mixture remaining after the feed to line 31 has been treated by this process exits at the top of the contact tower 24 and passes by the tower outlet line 131 to the inlet of an outlet scrubber 23. Scrubber 23 has a structure and operation like scrubber 22 and, therefrom, to the inlet 132 for the gas-to-gas exchanger 21. Exchanger 21 provides that the outlet gases from line 131 pass in heat exchange with the tubes as 133, 134, 135 and 136 in the gas-to-gas exchanger 21. Only four such tubes are shown in FIG. 2 for illustrative purpose while in fact 24 of such tubes are in each of the heat exchange chambers 140 and 141. Each of tubes as 133-136 is attached at each of its ends to a manifold as 137, 138, 139 and 140. The inlet gases in line 31 pass from manifold 140 into and through the like tubes as 135, 136 and many more like it to a manifold 139 in chamber 141 and from that manifold to a lower manifold 137 and from that manifold through many like heat exchange tubes as 133 and 134 in chamber 143 to an outlet manifold 138. The outlet gases pass from inlet 32 through the gas-to-gas exchanger in heat exchange contact with the inlet gases to the gas-to-gas exchanger 21. As shown only by example in one tube, 136, shown in longitudinal vertical section, each of the tubes in the gas-to-gas exchanger for the inlet gas mixture is provided with a spiral aluminum rod 142 which provides the dual functions of anodic protection and also makes turbulent the gaseous mixture fed through pipe or line 31 and therein suspended and/or carried solids and liquids passing therethrough so as to avoid settling of sediment therefrom in those tubes.

The contact tower 24 comprises an upper mist separating section 151, a middle liquor absorption section 152 and a lower liquor collection section 36. The upper section comprises a vertical extension of the shell 70 and a plurality of vertically spaced apart perforated metal sheets 181, 182, 183 made of expanded metal to trap mist. It serves to separate liquid components from gaseous mixture containing them by gravity settling. It does not have sprays of absorption liquor added thereto as does the middle tower section 152. The lower tower section 36 comprises a closed vessel with a level sensor and control lines connected thereto to contain and dispense liquor from the bottom thereof; it is essentially a storage and dispensing section and does not have connected thereto the spraying means for applying absorption liquor sprays to the gas content as are present in the middle absorption section. This contact tower 24 comprises a shell 70 and a plate and conduit structure 71.

The plate and conduit structure 71 is in section 152 and is composed of a plurality of vertical liquid conduits 40-48, and a plurality of horizontally extending plates 51-60 and, also, a plurality of peripherally located vertically extending gas conduits 61-69.

The geometrical and physical relations of the vertical conduits 40-48 and 61-69 and the plates 51-60 are shown in FIGS. 5-17. However the functional relation of the vertical conduits and the horizontal trays are shown in FIG. 4 for clarity of presentation of such functional relationships herebelow described.

Settling chambers 81-89 are formed between each of the plates or trays 51-59 and trays or plates 52-60 thereabove; each chamber is peripherally bounded by the shell 70; the shell 70 also supports a plurality of spray nozzles as 103-120 located and oriented and arranged to direct fluid at rapidly moving volumes of gas traveling through the confined space within the peripheral vertical gas conduits 61-69 and other spray assemblies 221-227. The plates and tubes of the plate and conduit structure 71 between plates 57 to 60 and between plates 51 to 56 are firmly fixed to each other but the shell 70 is affixed to the plate and tube structure assembly at one unit thereof including the plates 57 and 60 and at another unit thereof including the plates and tubes between plates 51 and 56 only at points on the top plate of such units which points are circumferentially spaced but not longitudinally spaced apart. The middle section 152 of shell unit 70 comprises a rigid steel cylindrical tube and couplings for each of nozzles as 103-120 and connections for nozzle assemblies as 221-227.

In assembly of the contact tower 24 the plate and tube structure portion shown in FIG. 5 is made as one unit all parts of which are firmly connected to each other and the plate and tube structure portion shown in FIG. 6 is made as another unit all parts of which are firmly connected to each other by welding; each such unit after assembly is firmly attached by welding the periphery of its top plate to a set of ledges or ears as 75 and 76, each firmly attached as by welding to the shell 70 and projecting internally of the shell to provide support to that top plate and thereby support the remainder of the unit only by the firm attachment by welding of the shell and tube unit and to the shell 70 at such uppermost plates of unit of FIG. 5 and unit of FIG. 6. A plurality of circumferentially spaced apart welds are as used to firmly attach such uppermost plates to the shell 70.

Figure 4:
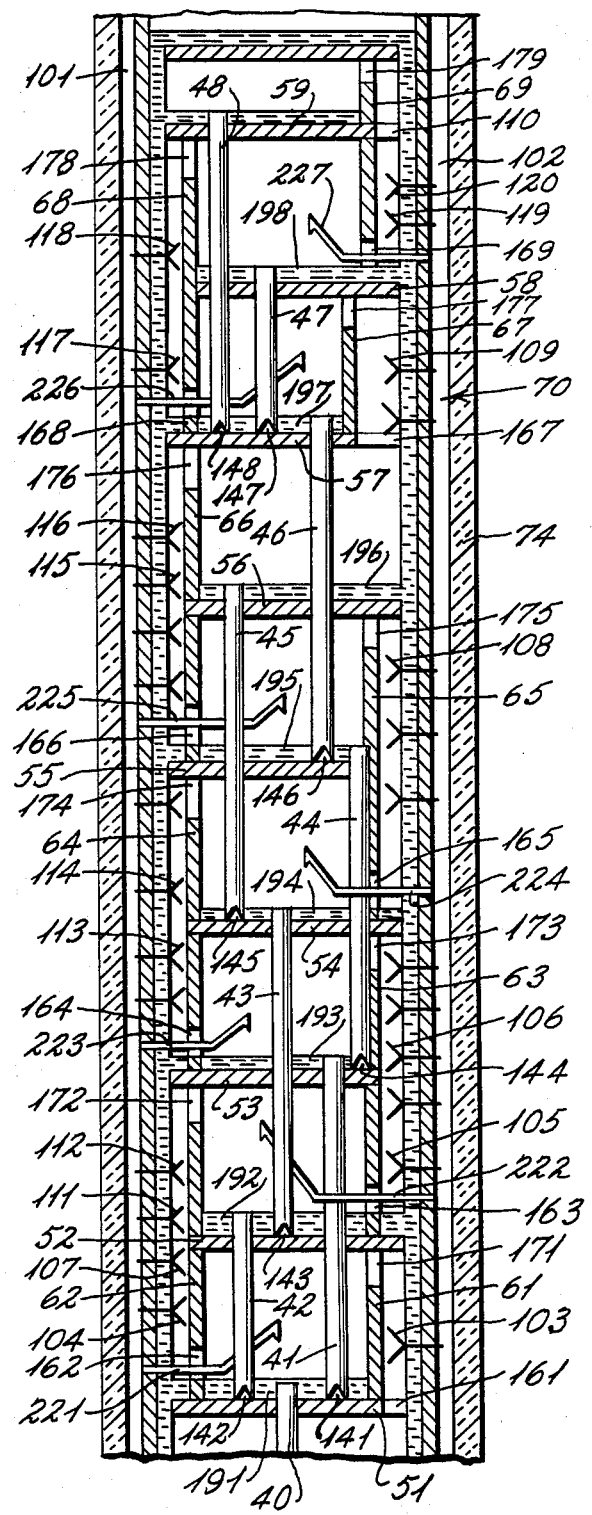
FIG. 4 is a diagramatic showing of the functional relationship of the vertical conduits 40-48 and 61-69 and spray assemblies as 103-120 and 221-227 to the trays 51-60 and liquors layers 191-199 thereon in the middle section 152 portion of the contact tower 24.

After the attachment of both portions of the plate and conduit unit 71 to the shell 70 and joining of the separate assemblies shown in FIGS. 5 and 6 in the combination in FIG. 4 and in FIG. 1 the nozzles assemblies as 103-120 and 221-227 are attached by the couplings therefor to the shell. Four couplings are provided on the shell 70 between the inlet opening as 162 and outlet opening as 172 of each gas conduit as 61-69 for attachment of a spray unit such as nozzles 103-120 (shown diagramatically in FIG. 4) thereto. A nozzle as 103-120 is attached to each such coupling and opens into the space between the lower and upper opening as 162 and 172 of each such gas conduit as 62 and is operatively attached to the line 101 or 102 and provides for controlled application of a spray of liquid from line 101 or 102 to that space. The nozzles 103–120 project into the cavity of the shell 70 for only a short distance e.g. one half to one inch and such nozzles are (as are assemblies 221–227) readily removable from the couplings therefor for adjustment and disassembly. A two inch thickness of insulation 74 is attached to the periphery of the shell for its entire length.

Such relationship of units 70 and 71 permits relative longitudinal movement between those two portions of the total tower assembly 24 to avoid thermal stresses and facilitate disassembly for cleaning and also provides a small (1/16 inch wide) annulus as 91–99 between each of the plates as 51–59 and the shell interior. The two separate assemblies 70 and 71 cooperate to form the chambers as 61–69 and the annulus (91–99) at the bottom of each chamber. The liquid passing downward and through the circumferential peripheral passages as 91–99 between the plates as 51–59 and the shell provides a effective seal against the passage of the gas upward through such peripheral openings yet such openings avoids pressure surges that otherwise occur in closed chambers.

The peripheral circumferential annular slit 91–99 immediately adjacent the wall at the periphery of each plate as 51–59 respectively provides for developing a vertically extending sheet or film of the absorbing liquid as 252 all around the periphery of each of the chambers 81–89 during operation of the tower 24. Accordingly the droplets that are produced by the spray from the nozzles into the vertical peripheral conduits 61–69 and in chambers 81–89 are provided with an area of liquid surface contact which is inclusive of such vertically extending film surfaces as 252 between the upper tray and the lower tray defining each of the chambers 81–89 as well as the horizontal surface of the liquid volumes 191–199 on top of the bottom tray as 51–59 defining each chamber as 81–89. Liquid layers 191–199 develop by addition of cold liquid from spray nozzles as 103–120 and 221–227 as well as from separation of liquid forming such layers from the suspension of components carried in the wellhead gaseous mixture and suspension fed to the tower 24.

The efficiency of absorption of liquid components from the mixture fed to the tower 24 is greatly increased by the availability of a smooth vertical liquid surfaces as 252 on which the drops may be impinged and held, because so impinging and, so being held thereby, carried downward to collection at 37 rather than depending only upon gravity effect for collection of the liquid droplets in the volumes of liquid as 191–199 located at the top of the bottom tray of each chamber as 81–89.

Additional to the above, in each of the chambers as 81–89 a like spray nozzle assembly as 221 (in chamber 82), 222 (in chamber 83), 223 (in chamber 84), 224 (in chamber 85), 225 (in chamber 88), and 226 (in chamber 89) is located between the outlet orifice as 171 of the gas conduit as 61 leading gas into that chamber and the inlet orifice as 162 of the gas conduit as 62 from which gas exits from such chamber. Each such like additional spray nozzle assembly as 221 comprises a bushing as 201 held in a union 202; the union is held in a coupling 203 attached to the wall 71 and is added to the shell 70 by the connections therefor, as 203, after the plate and tube assembly 71 and shell 70 are assembled. The added union as 202 carries an extending nipple 204 and a tubing 205 attached to a nozzle 206 which nozzle is located between the opening 162 in the conduit 62 and the opening 171 in conduit 61. Tubing 205 connects to line 101 by bushing 201.

The nozzle assembly nipple 204 extends through the bottom opening as 162 on the vertical gas conduit as 62 in each of the chambers 81–88 and extends past the center of the chamber as 81 and the nozzle 206 extends beyond the nipple and is located intermediate between inlet orifice and the outlet orifice, as 162, and it is directed at the inlet orifice, as 171. The volume and pressure of liquor passed through that nozzle is adjusted to be insufficient to stop the flow of gas outward of the inlet orifice as 171. In general as described for chamber 81 herebelow, which description is typical of the relations also developed in other chambers where spray assemblies as 221 are located, the surface of contact between the volume of gas and droplet mixture coming out of the inlet orifice as 171 and the cold liquid coming out of the nozzle 206 of assembly 225 is a backwardly bent or curved surface concave toward the nozzle 205; it provides a dynamic barrier which causes the incoming gaseous suspension to travel around such generally circular surface or zone of contact to the outlet orifice (162) of the peripheral gas conduit (as 62) for that chamber (as 81) with the result that the gas suspension coming from the orifice of the vertical gas conduit passes to the vertical walls of the chamber and, also, to the top surface of the liquor as 191 on top of the tray 51 in that chamber as 81 as well as to the roof of that chamber. The roof or upper surface of each chamber 81–89 is formed by the bottom surface of the plate of the chamber thereabove. As, for chamber 81, the liquid on the plate of the chamber thereabove (52) is at a lower temperature than the gas and liquor in the chamber (51) there is some condensation on the upper surface of chamber 81 and a surface of liquid thereupon which the gas droplets coming from the orifice of the vertical gas conduit 171 may impinge upon.

Figure 17:
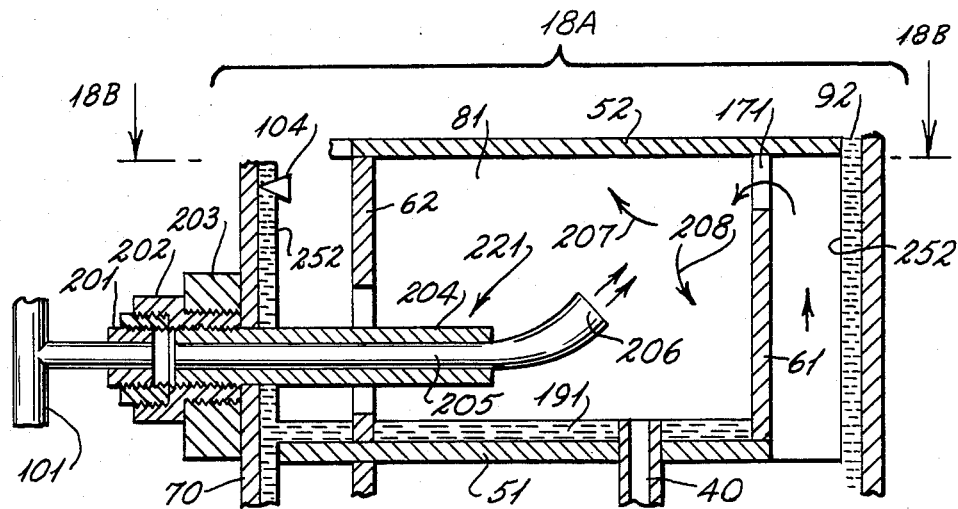
FIG. 17 is an illustrative, diagramatic, vertical sectional view along plane 17A-17A of FIG. 18 showing one spray assembly 221 in operating position.
Figure 18:
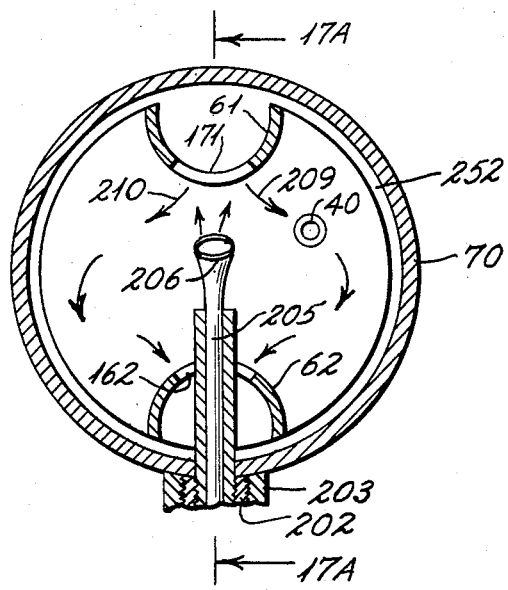
FIG. 18 is a diagramatic, illustrative, composite, generally sectional view of assembly 221 in Zone 18A of FIG. 17 in the general plane of section 18B-18B of FIG. 17 and axis of tubing 205 of assembly 221.

In operation a spray of cold liquor through the nozzle 206 which is connected by pipe or tubing 205 to a line as 101 causes the gas stream as shown in FIGS. 17 and 18 to move along paths as 207 and 208 and to impinge not only on the liquid 191 on top of the tray 51 but also to move laterally in paths as 209 and 210 so that there is a positive rather than a statistical or random movement of the gas exiting from each orifice as 171 to the other orifice as 162 in each chamber as 81. Additional spray nozzle assemblies 222–227 like 221 are located in chambers 82, 83, 84, 85, 86, 87, and 88. These serve to improve the positiveness of occurrence of impingement of all the droplets in the gas stream against the liquid surfaces as 252 on those walls and on the liquid on plates as 51 and 52 in those chambers.

This apparatus 20 provides that at the same pressure and temperature conditions this apparatus will provide recoveries as efficient as installations costing 5 to 10 times as much. More particularly, an installation according to this apparatus, 20 which cost $140,000 including a 20,000 gallon storage tank, treats 5 million cubic feet of gas in 24 hours is as efficient as a plant by Randall Corporation of Houston, Texas costing $750,000. Also this apparatus operates at 30% of the utility cost of competitive oil absorption operations or as produced by Jewel Thompson (J. T.) method and provides the same efficiency as a competitive apparatus provided by BCC Engineering Company of Midland costing $700,000.

The flow of the gaseous mixture or suspension which mixture and suspension contains propane, butane and/or gasoline fractions and water and iron sulfides developed in the well equipment as well as natural gas components as methane and ethane, fed from line 31 into the middle section 152 of the contact tower 24 accordingly is as follows: The gaseous feed mixture and suspension enters into the inlet opening 161 of pipe 61 and passes upward through the opening 211 in plate 51 and then out of the upper opening 171 of peripheral conduit 61. While traveling through the peripheral conduit 61 the gaseous mixture and suspension is met by the sprayed cold liquor from the nozzles as 103 and 104 located in the wall 70 and directed into the space bounded by the peripheral gas conduit 61 and the wall 70. The gaseous mixture and sprayed droplets pass from the upper opening 171 of the peripheral gas conduit 61 through the chamber 81 to the lower opening 162 of peripheral conduit 62 in chamber 81. The flow of the gaseous mixture is turbulent in that chamber and the droplets are there positively thrown into contact with the vertical liquid film on the chamber walls as well as the liquid layer 191 on the top of the tray 51 in the chamber 81. The liquid so separated from the gaseous mixture collects on the tray 51 and overflows into the top opening in pipe 40 and thence to the lower portion 36 of tower 24. Each vertical liquid conduit, as 42, has at its bottom an inverted v-shaped opening as 142. The depth of liquid as 191 at each tray as 51 is set by the height of the vertical liquid conduit as 40, projecting through and opening above that tray and deeper than the height of the inverted v-shaped opening 142 so as to block passage of vapor upward through such openings and conduit.

The gaseous mixtures and suspensions which respectively enter into the inlet openings 162-169 of pipes 62-69 passes upward through the openings as 212-219 in plates 52-59 and then out of the upper openings as 172-179 of peripheral conduits 62-69. While traveling through the peripheral conduits 62-69 respectively each gaseous mixture and suspension is met by the sprayed liquor from the nozzles as 103-119 located in the wall 70 and then directed by openings 172-179 into the space bounded by the peripheral gas conduits 62-69 and the wall 70. The gaseous mixture and sprayed droplets pass from the upper openings as 172-179 respectively of the peripheral gas conduits 62-69 through the chambers 82-89 to the lower opening 163-168 of the respective peripheral conduits as 63-68 in chambers 82-89. The flow of the gaseous mixture is turbulent in the chambers and the droplets are thrown into contact with the vertically extending liquid film on the walls as well as the liquid layers 192-198 on the top of the trays 52-59 in the chambers 82-88 respectively. The liquid components so separated from the gaseous mixtures collect on the trays and overflow into the top opening in pipes as 41-48. Each vertical liquid conduit, as 41-48 has at its bottom an inverted v-shaped opening. The depth of liquid as 192-198 at each tray as 52-57 is only about 2 inches in height which is slightly deeper than the effective height of the inverted v-shaped opening 141-148 in pipes as 41-48 so as to block passage of vapor upward through such conduits and openings.

Each of the exit holes formed in the vertical gas conduits is generally cut with a welding torch to provide a circular hole with a cross sectional area equal to or very slightly greater than the C-shaped tranverse or horizontal cross section of the vertical peripheral gas conduit.

Additionally where the spray units 221-225 are not used, the openings 162-168 and 171-178 may be made by an H (lying on its side) shaped cut with a slit extending vertically and two horizontal cuts spaced apart vertically and the portions of the wall adjacent the vertical slit turned in opposite directions so as to cause a tangential flow of the gas mixture entering to each chamber from the peripheral gas conduit opening thereinto and a similar cut made at the lower exit opening of the peripheral gas conduit so as to encourage a spiral flow in each of from the outlet as 171 of a gas conduit as 61 to the inlet as 162 of a gas conduit as 62 in the same chamber as 81.

The asymmetric location of the vertical liquid conduit pipes between the peripheral gas conduit outlet opening as 171 and the peripheral gas inlet opening as 162 provides for a nonlinear or turbulent path of the gas from such outlet to such inlet and encourages the impingement of liquid droplets carried by the gas stream upon the vertical liquid surface provided by this structure.

The vertically extending film on the interior wall of the shell provided by annular openings 91-99 of this apparatus especially in combination with nozzles 221-225 is particularly effective in capturing the droplets passing through the chambers between plates 51-59 because it is essentially a smooth film and moves in a laminar flow rather than being an agitated film; the laminar flow, and accordingly relatively smooth surfaced layer of liquid has adherence to the steel wall 70 and accordingly forms a thin layer which is smooth on its interior surface and mechanically stable and enhances the collection of the droplets produced by the spray (with the liquid absorbed from the gas by such spray droplets); the layer of liquid on each plate as 51-59 may also be relatively thin, i.e. only about one to two inches.

Dimensions of apparatus 20 are as follows: Height of tower 24 top to bottom is 31 feet. Height of level control 125 over bottom of tower 9 feet 3 inches. Center of inlet line 33 to shell 70, height over bottom 9 feet 11 inches. Height of tray 51 over bottom of tower 10 feet 8 inches. Space between plates 51 and 52, 52 and 53, 53 and 54, 54 and 55, 55 and 56, 56 and 57, 58 and 59 are all 18 inches. Vertical space between plates 57 and 58 is 3 feet. Space between plates 59 and 60 is 12 inches.

External diameter of shell 70 is 24 inches. External diameter of trays 51-60 is $23\frac{5}{8}$ inches. Wall thickness of shell 70 is 0.0250 inches. Thickness of trays 51-56, 58-60 is 0.25 inches. Thickness of tray 57 is 0.375 inches. Gas conduits tubes are 10 inch diameter of pipe 0.105 wall cut in half along diameter parallel to axis pipe.

Size of conduits 40-47: Conduits 43-48 are all 2 inch diameter pipe. Pipes 40, 41, and 42 are 3 inch diameter pipes. Pipe 40 is 9 foot 9 inches long. Pipe 41 is 20 and $\frac{1}{4}$ inches long. Pipe 48 is 4 feet 8 and $\frac{1}{4}$ inches long. Pipes 42-47 are 3 foot $2\frac{1}{4}$ inches long. The height of section 151 over the top of plate 60 is 6 feet. The height of the unit shown in FIG. 5 from bottom of plate 51 to top of plate 57 is 9 foot $0\frac{3}{8}$ inch and is made of 10 inch o.d. pipe of 0.105 wall pipe.

The openings in the gas conduits are, at the top of each conduit 6 and $\frac{5}{8}$ inch diameter and at the bottom of each of the gas conduits the hole as 161 is a slot 11 inches total length and $6\frac{5}{8}$ inch diameter.

The height of the unit shown in FIG. 5 is 9 foot and $\frac{5}{8}$ inch. The height of the unit shown in FIG. 6 is 7 foot, no inches.

Pipe No. 67 is 10 inch diameter and is not split. Pipe 67 is 2 foot 6 inches high; each tray plate is welded in place on both sides to the 10 inch diameter pipe adjacent thereto.

Each tube 41–47 projects 2 inches above the top of the plate adjacent to which the opening of that 2 or 3 inch pipe is located and each tube has a v-shaped notch 2 inches high at its bottom adjacent to the lower plate on which such tube rests.

The entire apparatus 20 except for the refrigeration unit 28 sits on a 7 foot wide by 18 foot long platform 29; the unit 28 has a 50 to 60 ton refrigeration capacity. Operating pump 26 at an output pressure of 30 p.s.i.a, the assembly 20 has a treating capacity of 1,000,000 cut ft. of gas per day; at 250 p.s.i.g. pump output pressure, unit 20 handles 5,000,000 cu. ft of gas per day. The scrubber 22 is formed of 12 foot ¾ inch diameter pipe, 10 feet long with 1.18 inch 0.188 wall; the gas-to-gas exchanger 21 has a total length of 8 feet, no inches, and each chamber thereof (141 and 143) is 10⅜ inch diameter, the tubes as 133–136 are 1 inch diameter, schedule 40 pipe and are 6 feet, 8 inches long.

I claim:

1. A vapor liquid contact tower for absorbing liquid from gas-liquid mixtures, said tower having a gas inlet and outlet and comprising:
    a liquid absorption section positioned in said tower so that gas passes therethrough from its bottom to its top;
    spray nozzle means positioned in the tower at said liquid absorption section for introducing cooled pressurized absorbing liquid into said liquid absorption section;
    a liquid collection section beneath said liquid absorption section; and
    liquid outlet means positioned in said tower such that, the absorbing liquid flows from said liquid absorption section to said liquid collection section then to said outlet means,
    said liquid absorption section being a portion of the tower shell and at least one longitudinal absorption unit located inside of and supported by the shell, with said at least one absorption unit comprising:
    a plurality of horizontal plates spaced-apart and spaced from the shell, creating thereby an annulus between each plate and the shell and also a chamber between adjacent plates; vertical liquid conduits interconnecting said plurality of plates, said vertical liquid conduits including a conduit extending down from adjacent each plate to drain liquid collected thereon to a lower plate; and vertical gas conduits, positioned adjacent the shell, said vertical gas conduits including a gas conduit connecting each pair of superposed adjacent chambers for flow of gas upward, chamber by chamber, through said at least one absorption unit and thereby through said liquid absorption section,
    said spray nozzle means for introducing absorbing liquid including at least one spray nozzle supported by the tower shell positioned for spraying liquid inside each vertical gas conduit, the absorbing liquid so introduced flowing from the gas conduit onto one of said plates subjacent thereto;
    said plates and conduits being firmly fixed together and thereby being a unitary plate and conduit absorption unit supported by said shell so as to permit relative movement between component portions of said at least one plate and conduit absorption unit and the tower shell.

2. A vapor liquid contact tower as in claim 1 wherein said spray nozzle means includes additional spray nozzles positioned at said liquid absorption section and supported by the tower shell, said additional spray nozzles further comprising a spray nozzle extending through and past each vertical gas conduit into one of said chambers adjacent thereto for directing absorbing liquid toward the gas entering the chamber.

3. A vapor liquid contact tower as in claim 1 wherein said at least one plate and conduit absorption unit includes at least one vertical liquid conduit which extends through two adjacent plates, generating thereby an alternate chamber to chamber liquid flow down through said at least one plate and conduit absorption unit.

4. A vapor liquid contact tower as in claim 1 further comprising cooling and pressurizing means connected to said tower, said liquid outlet means removing liquid from the liquid collection section of the tower being connected to an inlet for the cooling and pressurizing means, and an outlet from the cooling and pressurizing means being connected to said spray nozzle means.

5. A process for treating a gaseous feed mixture containing liquefiable components comprising:
    (a) passing such gaseous mixture into and up through a vertical gas conduit and at the same time spraying a cold liquor into said conduit, the cold liquor comprising liquefied components recovered from the gaseous mixture, then
    (b) passing such gaseous mixture and droplets entrained therein from said gas conduit horizontally into an absorption chamber having top, bottom and side walls at adjacent the top wall and said side wall thereof to pass therethrough horizontally and downwardly, the gaseous mixture and droplets entrained therein being directed toward side wall and bottom wall surfaces of said chamber whereon respectively a vertically extending liquid film and a horizontal liquid layer are present, whereby condensed liquefiable components and entrained droplets contact the liquid film and liquid layer becoming absorbed therein, the gaseous mixture reduced in liquefiable components content upon passage through said absorption chamber exiting therefrom adjacent the bottom wall of said chamber and adjacent said sidewall thereof located across said chamber from the entrance of the gaseous mixture thereto;
    (c) overflowing liquid from the chamber floor into a vertically extending conduit from which the liquid flows ultimately to liquid collection,
    (d) cooling and pressurizing a portion of the collected liquid and employing the cooled pressurized liquid as said cold liquor spray, and
    (e) removing the balance of the collected liquid.

6. Process as in claim 5 wherein said gaseous feed mixture is well head gas and said liquifiable components therein include propane and butane and said cold liquor contains liquified propane and butane.

7. The process of claim 5 wherein the gas exiting said chamber passes into another vertical gas conduit and is sprayed with said cold liquor as in said vertical conduit and then passes into and through another absorption chamber and contacts with liquid as is done in said chamber, and wherein liquid collecting on the floor of the other absorption chamber overflows therefrom peripherally to form a vertically extending liquid film on said wall of said absorption chamber and wherein some of the liquid on the floor of said absorption chamber passes thereto from the vertically extending conduit that drains said other absorption chamber.

8. The process of claim 5 wherein some of said cold liquor is sprayed directly into said absorption chamber at the gas and droplets entrained therein entering said absorption chamber, thereby diverting gas flow toward wall surfaces of said absorption chamber.

* * * * *